(12) United States Patent
Li et al.

(10) Patent No.: US 11,263,447 B2
(45) Date of Patent: Mar. 1, 2022

(54) INFORMATION PROCESSING METHOD, INFORMATION PROCESSING DEVICE, MOBILE TERMINAL, AND STORAGE MEDIUM

(71) Applicant: BEIJING XIAOMI MOBILE SOFTWARE CO., LTD., Beijing (CN)

(72) Inventors: Keyuan Li, Beijing (CN); Ming Liu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 16/909,924

(22) Filed: Jun. 23, 2020

(65) Prior Publication Data
US 2021/0248364 A1 Aug. 12, 2021

(30) Foreign Application Priority Data
Feb. 12, 2020 (CN) .......................... 202010088569.3

(51) Int. Cl.
*G06K 9/00* (2006.01)
*G06K 9/46* (2006.01)

(52) U.S. Cl.
CPC ........... *G06K 9/00456* (2013.01); *G06K 9/46* (2013.01); *G06K 2209/01* (2013.01)

(58) Field of Classification Search
CPC ... G06K 9/00456; G06K 9/46; G06K 2209/01
See application file for complete search history.

(56) References Cited

U.S. PATENT DOCUMENTS

| | | | | |
|---|---|---|---|---|
| 7,715,640 | B2 * | 5/2010 | Ozawa | H04N 1/41 382/239 |
| 2008/0018591 | A1 * | 1/2008 | Pittel | G06F 1/1686 345/156 |
| 2008/0043269 | A1 * | 2/2008 | Chen | G06K 9/00456 358/1.9 |

(Continued)

FOREIGN PATENT DOCUMENTS

CN 107103312 A * 8/2017

OTHER PUBLICATIONS

Anonymous:"Using Adobe Acrobat X Standard", Oct. 11, 2011, XP055330991, pp. 1-347, (Year: 2011).*

(Continued)

*Primary Examiner* — Jayesh A Patel
(74) *Attorney, Agent, or Firm* — Syncoda LLC; Feng Ma

(57) ABSTRACT

An information processing method includes: acquiring an image to be processed; determining object content of the image to be processed based on a recognition result of the image to be processed; and processing the image to be processed according to the object content to obtain a processed file including an editable file such as an Office file. As such, it is realized that the user determines the processing to be performed on the image to be processed according to the recognition result of the image to be processed, and obtain the processed format file, without specifying in advance the processing of the image to be processed, which brings convenience to the user in recognizing the image to be processed and improves the user experience.

20 Claims, 2 Drawing Sheets

(56) References Cited

U.S. PATENT DOCUMENTS

| | | | |
|---|---|---|---|
| 2009/0087112 A1* | 4/2009 | Zyuzin | H04N 1/41 382/243 |
| 2010/0253953 A1* | 10/2010 | Oota | H04N 1/642 358/1.9 |
| 2011/0238676 A1* | 9/2011 | Liu | H04M 1/72439 707/752 |
| 2016/0180164 A1* | 6/2016 | Xiong | G06F 40/103 382/177 |
| 2016/0357487 A1* | 12/2016 | Anbalagan | H04N 1/2166 |
| 2017/0286767 A1* | 10/2017 | Panferov | G06K 9/00483 |
| 2019/0199878 A1* | 6/2019 | Sekiguchi | H04N 1/40 |

OTHER PUBLICATIONS

Extended European Search Report in Application No. 20184536.9, dated Jan. 14, 2021.
Anonymous:"Using Adobe Acrobat X Standard", Oct. 11, 2011, XP055330991.

* cited by examiner

INFORMATION PROCESSING METHOD, INFORMATION PROCESSING DEVICE, MOBILE TERMINAL, AND STORAGE MEDIUM

CROSS-REFERENCE TO RELATED APPLICATION

This application claims priority to Chinese Patent Application 202010088569.3 filed on Feb. 12, 2020, the disclosure of which is hereby incorporated by reference in its entirety.

BACKGROUND

With the rapid development of technologies, there are more and more ways for users to obtain information. Images can include pictures and texts to record and transmit information. The large amount of information included in images can help improve efficiency of obtaining information.

Optical character recognition (OCR) can be a process of using electronic devices to check characters printed on the paper, determining the shapes thereof by detecting dark and bright patterns, and translating the shapes into computer-readable texts using character recognition methods. Text scanning application is a software product implemented based on the text scanning and the OCR recognition technologies. The text scanning applications applied to mobile terminals can scans files, pictures, and books to avoid manually entering contents, bring convenience to users to obtain, save, and use the information.

SUMMARY

The present disclosure relates generally to the field of image recognition technologies, and more specifically to an information processing method, an information processing device, and a computer-readable storage medium.

According to an aspect of the present disclosure, there is provided an information processing method, and the information processing method includes: acquiring an image to be processed; determining object content of the image to be processed based on a recognition result of the image to be processed; and processing the image to be processed according to the object content to obtain a processed file including an Office file.

In some embodiments, the image to be processed can be a plurality of images; the processing the image to be processed according to the object content to obtain a processed file includes: sorting a plurality of processing results corresponding to the plurality of images to be processed; and generating the corresponding files according to the plurality of sorted processing results.

In some embodiments, the processing the image to be processed according to the object content to obtain a processed file includes: performing format conversion on the image to be processed to obtain a format converted file corresponding to the image to be processed.

In some embodiments, the object content includes text information contained in the image to be processed; the processing the image to be processed according to the object content to obtain a processed file includes: recognizing the text information to obtain a text recognition result; determining a format type of the file; and generating a file of the format type corresponding to the text recognition result.

In some embodiments, the generating a file of the format type corresponding to the text recognition result includes: editing the text recognition result; and generating a file of the format type corresponding to the edited text recognition result.

In some embodiments, the editing the text recognition result includes performing language conversion on the text recognition result.

In some embodiments, the object content includes pictures contained in the image to be processed; the processing the image to be processed according to the object content to obtain a processed file includes: extracting the pictures in the image to be processed and saving them according to a set format.

According to another aspect of the present disclosure, there is provided an information processing device, and the information processing device includes: an acquiring component configured to acquire an image to be processed; a determining component configured to determine object content of the image to be processed based on a recognition result of the image to be processed; and a processing component configured to process the image to be processed according to the object content to obtain a processed file including an Office file.

In some embodiments, the image to be processed can be a plurality of images; and the processing component processes the image to be processed according to the object content to obtain a processed file in the following manner: sorting a plurality of processing results corresponding to the plurality of images to be processed; and generating the corresponding files according to the plurality of sorted processing results.

In some embodiments, the processing component processes the image to be processed according to the object content to obtain a processed file in the following manner: performing format conversion on the image to be processed to obtain a format converted file corresponding to the image to be processed.

In some embodiments, the object content includes text information contained in the image to be processed; and the processing component processes the image to be processed according to the object content to obtain a processed file in the following manner: recognizing the text information to obtain a text recognition result; determining a format type of the file; and generating a file of the format type corresponding to the text recognition result.

In some embodiments, the processing component generates a file of the format type corresponding to the text recognition result in the following manner: editing the text recognition result; and generating a file of the format type corresponding to the edited text recognition result.

In some embodiments, the processing component edits the text recognition result in the following manner: performing language conversion on the text recognition result.

In some embodiments, the object content includes pictures contained in the image to be processed; and the processing component processes the image to be processed according to the object content to obtain a processed file in the following manner: extracting the pictures in the image to be processed and saving them according to a set format.

According to yet another aspect of the present disclosure, there is provided a device, and the device includes: a processor; and memory storing instructions executable by the processor; wherein, the processor is configured to execute the information processing method according to any one of the above-mentioned items.

According to yet another aspect of the present disclosure, there is provided a non-transitory computer-readable storage medium, wherein when instructions in the storage medium are executed by a processor of a mobile terminal, the mobile terminal is enabled to execute the information processing method according to any one of the above-mentioned items.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this disclosure, illustrate embodiments consistent with the present disclosure and, together with the description, serve to explain the principles illustrating the present disclosure.

DETAILED DESCRIPTION

Description will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
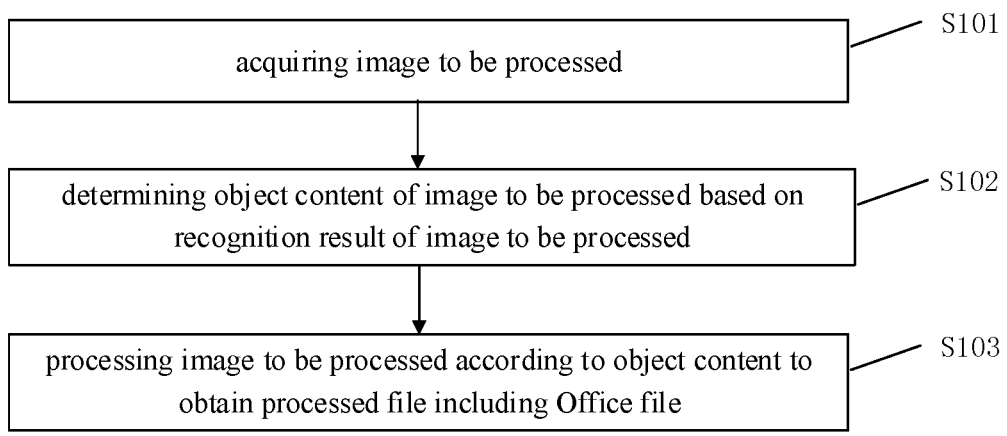
FIG. 1 is a flowchart illustrating an information processing method according to some exemplary embodiments of the disclosure.

FIG. 1 is a flowchart of an information processing method according to some exemplary embodiments, and the information processing method can be applied to a smart terminal device and executed by a processor in the smart terminal device, the smart terminal can be smart phones, smart tablets, wearable devices, personal handheld assistants, notebooks and other terminals, the present disclosure does not limit the specific types of terminals.

As shown in FIG. 1, the information processing method includes the following steps.

In step S101, an image to be processed is acquired.

The image to be processed can be an image acquired in real time through a terminal image-capturing device and stored locally in the terminal, an image received from other terminals, or an image downloaded from the network. There can be one or more images to be processed, for example, a plurality of pictures imported from the local album of the terminal, and for another example, a plurality of pictures acquired by the continuous shooting mode of the terminal.

In step S102, object content of the image to be processed is determined based on a recognition result of the image to be processed.

In the embodiments of the present disclosure, the image to be processed is recognized based on the OCR recognition technology, and object content of the image to be processed is determined based on the recognition result of the image to be processed. Regarding the object content of the image to be processed, for example, the image to be processed can be acquisition of objects such as documents, books, presentations (PPT), and the like, and the object content of the image to be processed can be text information contained in the document.

In step S103, the image to be processed is processed according to the object content to obtain a processed file including an Office file.

Based on the recognition result of the image to be processed by the OCR, the image to be processed is processed according to the object content of the image to be processed. Correspondingly, the images to be processed of different object content are processed differently to obtain processed files, and the processed files include editable files such as Office files. For example, the object content of the image to be processed is processed to obtain a processed Word file, PPT file, or PDF file.

In the embodiments of the present disclosure, for example, the object content of the image to be processed is processed, and the corresponding processing can be to extract the text in the image to be processed, analyze the text information and the like, and obtain a text recognition result, such that the user can process the text contained in the image as required.

According to the embodiments of the present disclosure, the acquired image to be processed is recognized, object content of the image to be processed is determined based on the recognition result of the image to be processed, and the image to be processed is processed according to the object content to obtain a processed file including an Office file. It is realized that the user does not need to specify the processing of the image to be processed in advance, and determines the processing to be performed on the image to be processed, according to the recognition result of the image to be processed, and obtain the processed format file, which brings convenience to the user to recognize the image to be processed and improves the user experience.

In some embodiments, the categories of the images to be processed can also be the certificate type, for example, identification card, transport documentation, operation license, and the like, which are used to characterize the identity information of the owner for verification of identity, qualification, etc.

For the image to be processed of the certificate type, the corresponding processing can be format conversion according to the user's usage requirements, and generate a file of the corresponding format type, so as to facilitate the preservation and use of the certificate. For example, the obtained user certificate information is saved as a picture format type, to facilitate transmission and printing, or saved as a portable document, that is, a PDF format, which is convenient for carrying around and printing at any time.

In some embodiments, the image to be processed can be a plurality of images, and a plurality of processing results corresponding to the plurality of images to be processed are sorted; and corresponding files are generated according to the plurality of sorted processing results.

When there are a plurality of images to be processed, the object content of the plurality of images to be processed can correspond to the same document, and a plurality of processing results can be obtained according to the recognition results of the plurality of images to be processed, the processing results of the plurality of images to be processed are sorted, and the corresponding files are generated according to the plurality of sorted processing results.

In the embodiments of the present disclosure, sorting the processing results of the plurality of images to be processed to generate processing files in a correct order can be to automatically generate sorting according to the recognition result, and when there is no sorting feature text information in the recognition result, the user can manually sort the processing results of the plurality of images to be processed to ensure the accurate order of the corresponding files generated by the plurality of images to be processed.

In some embodiments, the image to be processed is format-converted to obtain a format-converted file corresponding to the image to be processed.

In the embodiments of the present disclosure, the acquired image to be processed is format-converted, for example, is converted into a file in PDF format, Word format, PPT format, and the like, which brings convenience to users in the application of images to be processed.

The image to be processed is the acquired multipage PPT, the user generally wants to save the multiple PPT in the required format type, for example, save it in a PDF format to generate data that is easy to use and save.

In some embodiments, the object content includes text information contained in the image to be processed, and the text information is recognized to obtain a text recognition result; a format type of the file is determined; and a file of the format type corresponding to the text recognition result is generated.

The image to be processed contains a lot of text information, for example, the image obtained from the shooting of files, book pages, tables, etc., and the user's processing requirements can be to obtain the text information contained in the image to be processed, and to use the text information.

It can be to recognize the text information contained in the image to be processed to obtain a text recognition result, or to display the recognized text content through the interactive interface, or display a prompt window to ask the user to select the desired processing. For example, the text is copied and saved in a notepad and the like.

The text recognition result is saved according to the set format type, for example, the text recognition result is saved in PDF format, Word format, etc., a format file containing the text content corresponding to the text recognition result is generated, and the corresponding file is saved, which is convenient to obtain the relevant text information directly in the file in the future. It brings convenience to the user to obtain information.

In some embodiments, the text recognition result is edited; and a file of the format type corresponding to the edited text recognition result is generated.

The text contained in the image to be processed is recognized, and there may be errors in the text recognition result due to the quality problem or recognition error of the image to be processed. Alternatively, when the user needs to adjust or supplement the text recognition results adaptively according to personalized requirements, the user can edit the text recognition results according to the displayed text content, such as supplement, revise, and adjust the text or format to obtain the edited text content.

The edited text recognition results are saved according to the set format type as required. For example, the edited text recognition results can be saved in Word format, PDF format, PPT format, etc., to better meet the user's usage requirements and convenient operation.

In some embodiments, language conversion is performed on the text recognition result.

The text contained in the image to be processed is recognized, when the language of the text is foreign language, pinyin characters, and the like, the recognized text content of the foreign language can be displayed through the interactive interface, and the translation results that match the language used by the current terminal can also be displayed. The user can choose to use the recognized text of foreign languages, and can also perform various operations on the converted text of languages. In this way, the manual operation of the user for text translation is eliminated, and the user experience can be improved.

In some embodiments, the object content includes pictures contained in the image to be processed, and the pictures in the image to be processed is extracted and saved in accordance with the set format.

The object content of the image to be processed can include text, pictures, or both text and pictures, and corresponding processing can be performed on the text and pictures separately, for example, the text is recognized and saved as files in a variety of editable forms, such as Office formats. The pictures can be extracted, and can be edited and operated normally in the office software such as Office, such that the user can directly edit the pictures in the target content to meet the user's usage requirement.

In some embodiments, the user can set a matching relationship between the object content of the image to be processed and the preferred processing mode at the terminal according to the usage preference. When having determined the object content of the image to be processed, the terminal can match the processing of the category according to the user's personalized settings and process the image to be processed, which further reduces the operation steps for recognizing the images and brings convenience to the user.

For example, the user takes pictures of the training blackboard, and the blackboard includes drawings and text records, the user can set the processing of this category of images to be processed as being converted to PDF format and saved. When determining that it is the category, the processing of being converted to PDF format and saved is performed.

In the embodiments of the present disclosure, the acquired image to be processed, that is, the picture format is format-converted, for example, converted into a PDF format, a Word format, a PPT format, and the like.

For example, it is determined that the image to be processed is an image generated by taking photos of the certificate, and the user's recognition operation on the image of the certificate type is most likely to be saved in accordance with the required format type. It can be to display the effect of the image to be processed after format processing through the terminal interactive interface or to display a prompt window to ask the user to determine to perform processing. The user also selects other processing required for the image to be processed as needed.

Understandably, the processing determined for the current image to be processed may not meet the user's requirements, and more option prompt bars can be set, and the user can select other more processing as needed, such that the selection is more flexible, and further brings convenience to the user's usage.

In some embodiments, the image to be processed is input into a classification and recognition model, and the category of the image to be processed is obtained by the classification and recognition model.

The classification and recognition model is used to determine the category of image to be processed, such as a text type, a certificate type or the like, the image to be processed can be determined as the certificate type based on the image layout form of the certificate type. The classification and recognition can also be to perform semantic analysis based on the recognized text contained in the image to be processed to determine the category of the image to be processed. The category of the image to be processed is determined by using the classification and recognition model, which can make the determination of category of the image to be processed more accurate, so as to provide a processing mode that matches the category later.

In some embodiments, the image to be processed is sent to the server. The server includes the classification and recognition model for recognizing the category of the image to be processed and receiving the category of the image to be processed sent from the server. The server's computing advantages is fully utilized, and the speed of recognizing the category of the image to be processed is increased.

In some embodiments, the image to be processed is format-converted to obtain a format-converted file corresponding to the image to be processed. The file format corresponding to the image to be processed can be converted again, that is, mutual conversion among PDF format, Word format, and PPT format.

For example, for the PDF format file generated by saving the image to be processed, the user can convert again the PDF format to the Word format for use, as required.

In some embodiments, the image to be processed is format-converted to obtain a format-converted file corresponding to the image to be processed, and when the saved format is the PPT format, the user can also edit the PPT format file as required, for example, add notes of text or pictures, add watermarks, drag to adjust sorting, adjust page display angle, and the like in PPT format file.

For the result after processing the image to be processed of the certificate type, such as the generated PDF format file, marks such as watermark etc. can be added at the corresponding position of the PDF file to prevent the certificate from being used for other purposes, thereby ensuring the privacy of users.

In some embodiments, for the processing results of a plurality of formats generated after processing the image to be processed, operations such as editing, printing, saving and the like can be supported, which brings convenience for users to use information and improves the user experience.

Figure 2:
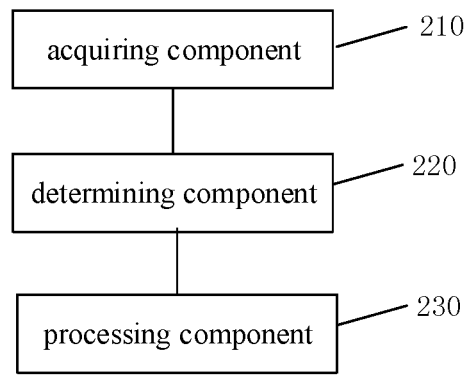
FIG. 2 is a block diagram illustrating an information processing device according to some exemplary embodiments of the disclosure.

FIG. 2 is a block diagram of an information processing device according to some exemplary embodiments. As shown in FIG. 2, the information processing device 200 includes: an acquiring component 210, a determining component 220 and a processing component 230.

The acquiring component 210 is configured to acquire an image to be processed.

The determining component 220 is configured to determine object content of the image to be processed based on a recognition result of the image to be processed.

The processing component 230 is configured to process the image to be processed according to the object content to obtain a processed file including an Office file.

In some embodiments, there are a plurality of images to be processed, and the processing component 230 processes the image to be processed according to the object content to obtain a processed file in the following ways: sorting a plurality of processing results corresponding to the plurality of images to be processed; and generating the corresponding files according to the plurality of sorted processing results.

In some embodiments, the processing component 230 processes the image to be processed according to the object content to obtain a processed file in the following way: performing format conversion on the image to be processed to obtain a format converted file corresponding to the image to be processed.

In some embodiments, the object content includes text information contained in the image to be processed; and the processing component 230 processes the image to be processed according to the object content to obtain a processed file in the following way: recognizing the text information to obtain a text recognition result; determining a format type of the file; and generating a file of the format type corresponding to the text recognition result.

In some embodiments, the processing component 230 generates a file of the format type corresponding to the text recognition result in the following way: editing the text recognition result; and generating a file of the format type corresponding to the edited text recognition result.

In some embodiments, the processing component 230 edits the text recognition result in the following way: performing language conversion on the text recognition result.

In some embodiments, the object content includes pictures contained in the image to be processed; and the processing component 230 processes the image to be processed according to the object content to obtain a processed file in the following way: extracting the pictures in the image to be processed and saving them according to a set format.

With respect to the device in the above embodiments, the implementations for performing operations by individual components therein have been described in detail in the embodiments regarding the methods, which will not be elaborated herein.

Figure 3:
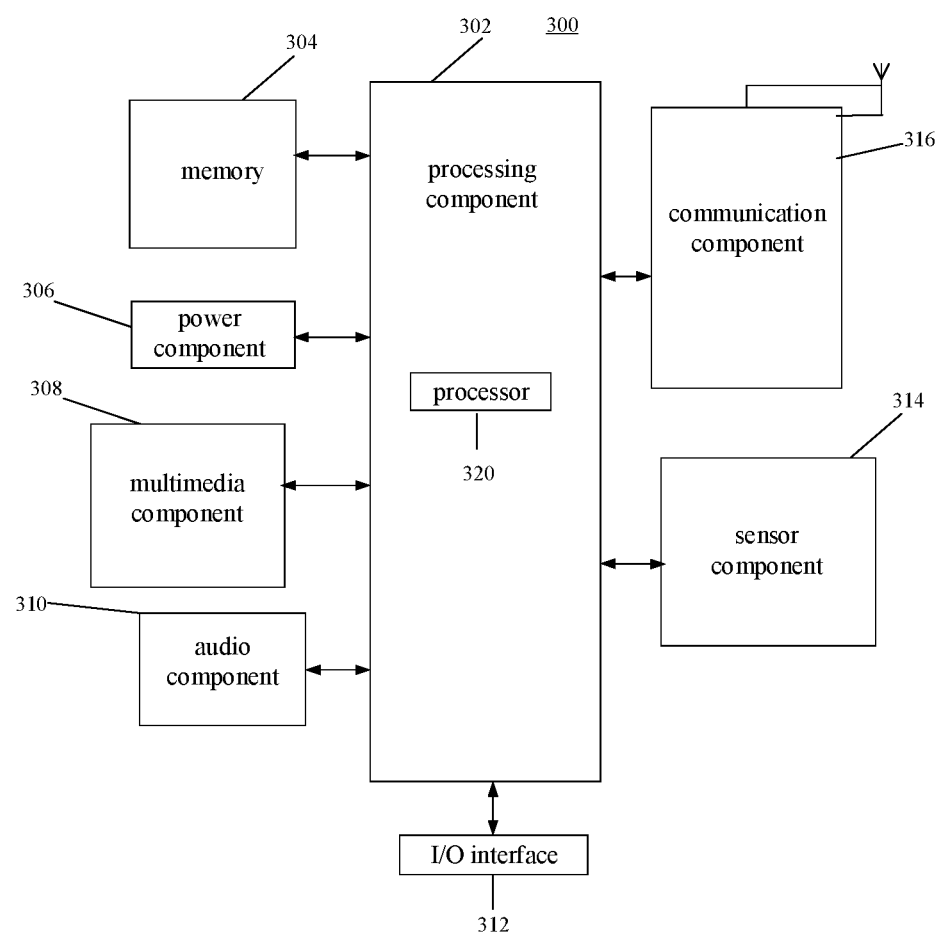
FIG. 3 is a block diagram illustrating a device according to some exemplary embodiments.

FIG. 3 is a block diagram of an information processing device 300 according to some exemplary embodiments. For example, the information processing device 300 may be a mobile phone, a computer, a digital broadcast terminal, a messaging device, a gaming console, a tablet, a medical device, fitness equipment, a personal digital assistant, and the like.

Referring to FIG. 3, the information processing device 300 may include one or more of the following components: a processing component 302, a memory 304, a power component 306, a multimedia component 308, an audio component 310, an input/output (I/O) interface 312, a sensor component 314, and a communication component 316.

The processing component 302 typically controls overall operations of the information processing device 300, such as the operations associated with display, telephone calls, data communications, camera operations, and recording operations. The processing component 302 may include one or more processors 320 to execute instructions to implement all or part of the steps in the above described methods. Moreover, the processing component 302 may include one or more modules which facilitate the interaction between the processing component 302 and other components. For instance, the processing component 302 may include a multimedia module to facilitate the interaction between the multimedia component 308 and the processing component 302.

The memory 304 is configured to store various types of data to support the operation of the information processing device 300. Examples of such data include instructions for any applications or methods operated on the information processing device 300, contact data, phonebook data, messages, pictures, videos, etc. The memory 304 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 306 supplies power to various components of the information processing device 300. The power component 306 may include a power management system, one or more power sources, and any other components associated with the generation, management, and distribution of power in the information processing device 300.

The multimedia component 308 includes a screen providing an output interface between the information processing device 300 and a user. In some embodiments, the screen may include a liquid crystal display (LCD) and a touch panel (TP). In some embodiments, organic light-emitting diode (OLED) or other types of displays can be employed.

If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 308 includes a front camera and/or a rear camera. The front camera and/or the rear camera can receive external multimedia data while the information processing device 300 is in an operation mode, such as a photographing mode or a video mode. Each of the front camera and the rear camera may be a fixed optical lens system or have focus and optical zoom capability.

The audio component 310 is configured to output and/or input audio signals. For example, the audio component 310 includes a microphone ("MIC") configured to receive an external audio signal when the information processing device 300 is in an operation mode, such as a call mode, a recording mode, and a voice recognition mode. The received audio signal can be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like. The buttons may include, but are not limited to, a home button, a volume button, a starting button, and a locking button.

The sensor component 314 includes one or more sensors to provide status assessments of various aspects of the information processing device 300. For instance, the sensor component 314 can detect an on/off status of the information processing device 300, relative positioning of components, e.g., the display and a keypad, of the information processing device 300, the sensor component 314 can also detect a change in position of the information processing device 300 or one component of the information processing device 300, a presence or absence of user contact with the information processing device 300, an orientation or an acceleration/deceleration of the information processing device 300, and a change in temperature of the information processing device 300. The sensor component 314 may include a proximity sensor configured to detect the presence of nearby objects without any physical contact. The sensor component 314 may also include a light sensor, such as a CMOS or CCD image sensor, for use in imaging applications. In some embodiments, the sensor component 314 can also include an accelerometer sensor, a gyroscope sensor, a magnetic sensor, a pressure sensor, or a temperature sensor.

The communication component 316 is configured to facilitate wired or wireless communication between the information processing device 300 and other devices. The information processing device 300 can access a wireless network based on a communication standard, such as Wi-Fi, 2G, 3G, 4G, or 5G, or a combination thereof. In one exemplary embodiment, the communication component 316 receives a broadcast signal or broadcast associated information from an external broadcast management system via a broadcast channel. In one exemplary embodiment, the communication component 316 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the information processing device 300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as the memory 304 including the instructions executable by the processor 320 in the information processing device 300, for performing the above-described methods. For example, the non-transitory computer-readable storage medium can be a ROM, a random access memory (RAM), a CD-ROM, a magnetic tape, a floppy disc, an optical data storage device, and the like.

The various embodiments of the present disclosure can have one or more of the following advantages.

The acquired image to be processed is recognized, object content of the image to be processed is determined based on the recognition result of the image to be processed, and the image to be processed is processed according to the object content to obtain a processed file including an Office file. It is realized that the user determines the processing to be performed on the image to be processed according to the recognition result of the image to be processed, and obtain the processed format file, without specifying in advance the processing of the image to be processed, which brings convenience to the user in recognizing the image to be processed and improves the user experience.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. An information processing method, comprising:
   acquiring an image to be processed;
   determining object content of the image to be processed based on a recognition result of the image to be processed; and
   processing the image to be processed without specifying in advance the processing of the image to be processed according to the object content to obtain a processed file comprising an editable file.

2. The information processing method according to claim 1, wherein the image to be processed comprises a plurality of images; and
   the processing the image to be processed according to the object content to obtain a processed file comprises:

sorting a plurality of processing results corresponding to the plurality of images to be processed; and
generating the corresponding files according to the plurality of sorted processing results.

3. The information processing method according to claim 1, wherein the processing the image to be processed according to the object content to obtain a processed file comprises:
performing format conversion on the image to be processed to obtain a format converted file corresponding to the image to be processed.

4. The information processing method according to claim 3, wherein the object content comprises text information contained in the image to be processed; and
the processing the image to be processed according to the object content to obtain a processed file comprises:
recognizing the text information to obtain a text recognition result;
determining a format type of the file; and
generating a file of the format type corresponding to the text recognition result.

5. The information processing method according to claim 4, wherein the generating a file of the format type corresponding to the text recognition result comprises:
editing the text recognition result; and
generating a file of the format type corresponding to the edited text recognition result.

6. The information processing method according to claim 5, wherein the editing the text recognition result comprises performing language conversion on the text recognition result.

7. The information processing method according to claim 3, wherein the object content comprises pictures contained in the image to be processed; and
the processing the image to be processed according to the object content to obtain a processed file comprises:
extracting the pictures in the image to be processed and saving them according to a set format.

8. An information processing device, comprising:
memory storing processor-executable instructions;
a processor configured to execute the instructions to:
acquire an image to be processed;
determine object content of the image to be processed based on a recognition result of the image to be processed; and
process the image to be processed without specifying in advance the processing of the image to be processed according to the object content to obtain a processed file comprising an editable file.

9. The information processing device according to claim 8, wherein the image to be processed is a plurality of images; and
the processor is further configured to process the image to be processed according to the object content to obtain a processed file by:
sorting a plurality of processing results corresponding to the plurality of images to be processed; and
generating the corresponding files according to the plurality of sorted processing results.

10. The information processing device according to claim 9, wherein the processor is further configured to process the image to be processed according to the object content to obtain a processed file by:
performing format conversion on the image to be processed to obtain a format converted file corresponding to the image to be processed.

11. The information processing device according to claim 10, wherein the object content comprises text information contained in the image to be processed; and
the processor is further configured to process the image to be processed according to the object content to obtain a processed file by:
recognizing the text information to obtain a text recognition result;
determining a format type of the file; and
generating a file of the format type corresponding to the text recognition result.

12. The information processing device according to claim 11, wherein the processor is further configured to generate a file of the format type corresponding to the text recognition result by:
editing the text recognition result; and
generating a file of the format type corresponding to the edited text recognition result.

13. The information processing device according to claim 12, wherein the processor is configured to edit the text recognition result by: performing language conversion on the text recognition result.

14. The information processing device according to claim 10, wherein the object content comprises pictures contained in the image to be processed; and
the processor is further configured to process the image to be processed according to the object content to obtain a processed file by:
extracting the pictures in the image to be processed and saving them according to a set format.

15. A non-transitory computer-readable storage medium having stored therein instructions executed by a processor of a mobile terminal which is enabled to execute operations of:
acquiring an image to be processed;
determining object content of the image to be processed based on a recognition result of the image to be processed; and
processing the image to be processed without specifying in advance the processing of the image to be processed according to the object content to obtain a processed file comprising an editable file.

16. The storage medium according to claim 15, wherein the image to be processed is a plurality of images; and
the processing the image to be processed according to the object content to obtain a processed file comprises:
sorting a plurality of processing results corresponding to the plurality of images to be processed; and
generating the corresponding files according to the plurality of sorted processing results.

17. The storage medium according to claim 15, wherein the processing the image to be processed according to the object content to obtain a processed file comprises:
performing format conversion on the image to be processed to obtain a format converted file corresponding to the image to be processed.

18. The storage medium according to claim 17, wherein the object content comprises text information contained in the image to be processed; and
the processing the image to be processed according to the object content to obtain a processed file comprises:
recognizing the text information to obtain a text recognition result;
determining a format type of the file; and
generating a file of the format type corresponding to the text recognition result.

19. The storage medium according to claim 18, wherein the generating a file of the format type corresponding to the text recognition result comprises:
- editing the text recognition result; and
- generating a file of the format type corresponding to the edited text recognition result;
- wherein the editing the text recognition result comprises performing language conversion on the text recognition result.

20. A mobile terminal comprising the information processing device according to claim 8 and a display screen, wherein the mobile terminal is configured to:
- enable a user determining the processing to be performed on the image to be processed according to the recognition result of the image to be processed; and
- obtain a processed format file, without specifying in advance the processing of the image to be processed;
- wherein the editable file is editable by one or more Office applications of the mobile terminal.

* * * * *